United States Patent [19] [11] 3,732,437
Sharp [45] May 8, 1973

[54] CONTROL CIRCUITRY FOR ANTI-LOCK BRAKE SYSTEM
[75] Inventor: Denis Sharp, Sussex, England
[73] Assignee: U.S. Philips Corporation, New York, N.Y.
[22] Filed: Mar. 15, 1971
[21] Appl. No.: 124,218

[30] Foreign Application Priority Data
Mar. 18, 1970  Great Britain.....................13,147/70

[52] U.S. Cl. ..................307/233, 307/228, 307/235, 328/132
[51] Int. Cl.............................................H03d 13/00
[58] Field of Search......................307/233, 228, 235; 328/132

[56] References Cited
UNITED STATES PATENTS

3,233,946  2/1966  Lockhart..........................307/233 X
3,305,732  2/1967  Grossman et al.....................307/233
3,413,490  11/1968  Breunig et al. .......................307/233
3,440,442  4/1969  Ehni.....................................307/233
3,497,816  2/1970  Fritz et al. .........................307/233 X
3,584,298  6/1971  Kolbiaz..............................307/233 X Primary Examiner—John S. Heyman
Attorney—Frank R. Trifari

[57] ABSTRACT

A control circuitry for anti-lock brake systems for wheeled vehicles. The control circuit comprises means for producing a waveform whose frequency is the same as that of an AC signal produced in response to wheel rotation, said waveform has a peak value which is a function of the instantaneous frequency of the AC signal. The control circuit can detect a predetermined rate of change of the wheel.

14 Claims, 14 Drawing Figures

CONTROL CIRCUITRY FOR ANTI-LOCK BRAKE SYSTEM

This invention relates to control circuit means for detecting frequency variations in an AC signal and especially useful in a control circuit of an anti-lock brake system for wheeled vehicles that deliver an output signal when the frequency of the AC signal exceeds a given rate of change. The control circuit includes means responsive to an alternating electric signal for generating a waveform of the same frequency as the alternating electric signal and with a peak value that is a function of the instantaneous frequency thereof, and capacitor storage means for storing said peak value. Such brake systems can improve vehicle braking performance and are successful in reducing the risk of skidding due to wheel lock and in maintaining directional control during braking, and can also reduce braking distances.

The invention also relates to anti-lock vehicle brake systems of the character comprising, for use in conjunction with a vehicle wheel and associated wheel brake, a wheel movement sensor for producing electrical signals related to rotational movement of the wheel, control circuit means which is responsive to said electrical signals to produce an electrical output when deceleration of the wheel is in excess of a predetermined value, and control valve means actuated as a consequence of said electrical output to relieve the braking pressure applied to the wheel brake by a fluid pressure source of the system.

In an anti-lock vehicle brake system of the above character, the wheel movement sensor can comprise a magnetic pickup mounted adjacent to the wheel being controlled together with a co-operating ferromagnetic toothed ring mounted on the wheel for rotation therewith so as to produce a train of pulses (constituting said electrical signals) whose frequency is proportional to the speed of rotation of the wheel.

The control circuit means can be arranged to amplify and limit these pulses and then convert them to a steady voltage, which may be referred to as a speed signal, whose value is proportional to the pulse frequency (see co-pending U.S. Pat. applications Ser. Nos. 858,420 58,349 and 58,350). This speed signal can then be differentiated in the control circuit means in order to determine wheel deceleration and when the latter is in excess of a predetermined value the control circuit means is responsive to produce the electrical output for actuating the control valve means (which is usually a solenoid valve) to relieve braking pressure.

It is an object of the present invention to provide a control circuit means for detecting, in response to said train of pulses, when a wheel exceeds a predetermined deceleration (or acceleration) without employing the step of differentiating a voltage proportional to wheel speed.

According to the present invention there is provided in, or for use in, an anti-lock vehicle brake system, a control circuit means comprising responsive to an alternating electrical signal for generating a waveform whose frequency is the same as the frequency of the alternating electrical signal and whose peak value is a function of the instantaneous frequency of the alternating electrical signal, capacitor storage means for storing said peak value, and a control circuit means characterized by current path means for causing or allowing the voltage on said capacitor storage means due to said peak value to change at a predetermined rate during the interval between successive peak values of said waveform, and means for detecting when the amplitude of said waveform is changing faster than the voltage on said capacitor storage means and thereby to deliver an output signal. Thus, with the alternating electrical signal being derived in response to wheel rotational movement so that its frequency is proportional to wheel speed, the control circuit means can detect a predetermined rate of charge (i.e. deceleration or acceleration) of the wheel.

It has been found that this means of detecting a given deceleration or acceleration is more accurate than the prior method of differentiating a voltage proportional to wheel speed.

In order that the invention may be more fully understood reference will now be made by way of example to the accompanying drawings in which:

FIG. 12 is a block diagram of an anti-lock vehicle brake system of the character referred to.

Figure 1:
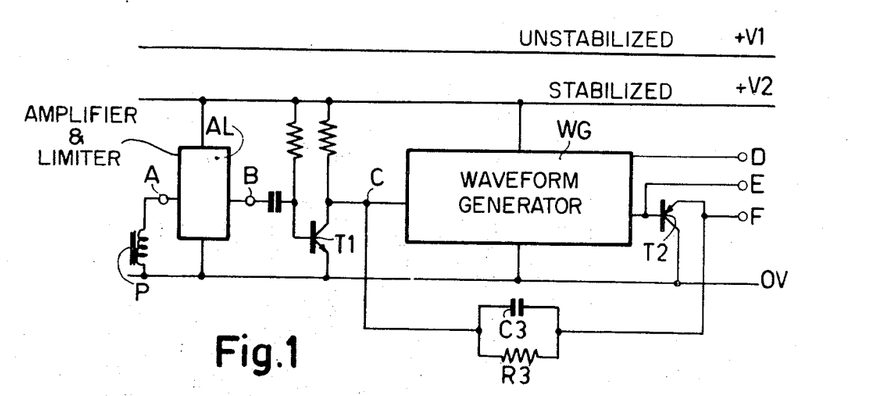
FIG. 1 shows the front part of a control circuit means of an anti-lock vehicle brake system of the character referred to up to the point where deceleration (and acceleration) sensing takes place.
Figure 2:
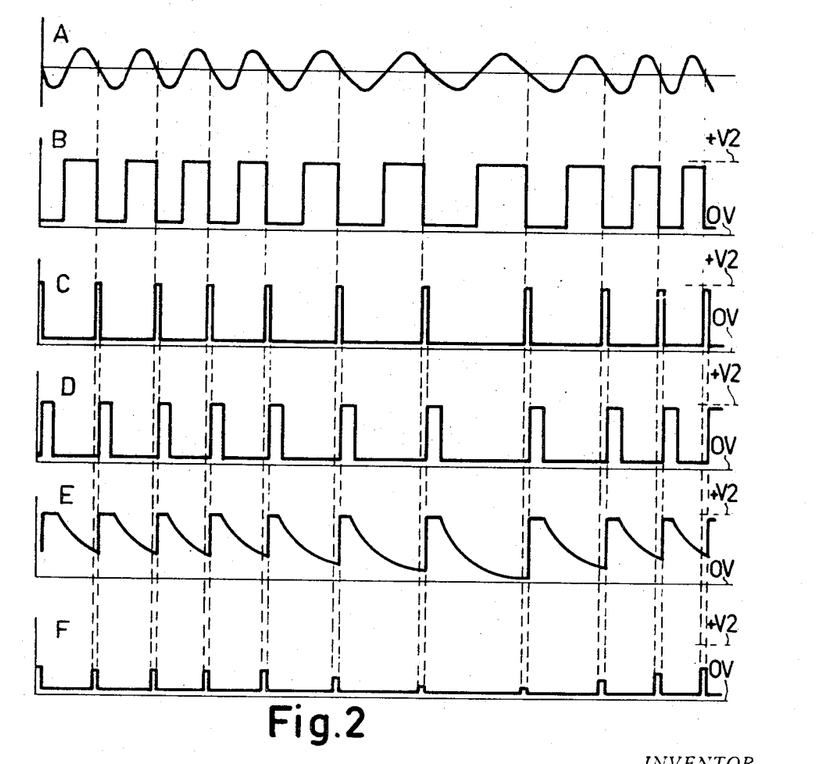
FIG. 2 shows waveform diagrams for FIG. 1.

Referring to the drawings, the circuit part shown in FIG. 1 comprises an amplifier and limiter AL which is shown as a box with input and output terminals A and B. This amplifier and limiter circuit is suitably of the form disclosed in co-pending U.S. patent application Ser. No. 58,348, and its input is connected to the "-pick-up" of a wheel movement sensor to receive an alternating electrical signal whose frequency is proportional to wheel speed. The waveforms A and B in FIG. 2 show that the applied alternating electrical signal is amplified and limited to produce a square wave output of constant amplitude. In the last-mentioned co-pending application the amplifier and limiter circuit was connected directly to a waveform generator which, in the present application, is shown as WG. This waveform generator may be of any of the forms disclosed in co-pending U.S. Pat. applications Ser. Nos. 858,420 58,349, and 58,350. In the present circuit the operation of the waveform generator WG is delayed by about 200 $\mu$ sec by a transistor T1. The output of transistor T1 is shown in waveform C in FIG. 2. The normal output of the waveform generator WG is shown in waveform E in FIG. 2. This is basically a waveform which is reset up to the supply line voltage and held there for a preset time (usually about 1 milli-sec) before being allowed to decay. Preferably, the decay is as a rectangular hyperbola as in the waveform generator of cotpending application Ser. No. 58,350. The waveform is reset each time the voltage at terminal C goes negative.

By using a rectangular hyperbola, the voltage amplitude at terminal E, just before the waveform is reset, is proportional to the frequency of the alternating electrical signal applied at terminal A. Transistor T2 samples the waveform at terminal E and produces a voltage pulse at terminal F whose amplitude is also proportional to the frequency of the applied alternating electrical signal. For this sampling, the emitter of transistor T2 is connected via the parallel combination of a capacitor C3 and a resistor R3 to the point C so that this emitter is taken positive for a sampling period equal to the duration of the pulses at C.

During the period when the waveform at terminal E is being held at the supply voltage there is a positive pulse available at terminal D.

Thus the circuit shown in FIG. 1 produces three synchronous outputs at terminals D, E, and F. The output at E has a waveform whose most negative value is proportional to the frequency of the applied alternating electrical signal. This is used to drive an acceleration detector, as will be described. Similarly, the output at terminal F has a waveform whose positive value is proportional to the frequency of the applied alternating electrical signal. This is used to drive a deceleration detector as will be described.

The output at terminal D is used to reset both of these detectors.

Figure 3:
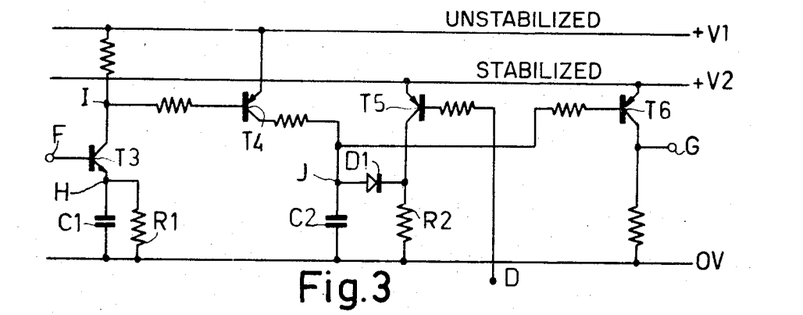
FIG. 3 shows a deceleration detector of the control circuit means.
Figure 4:
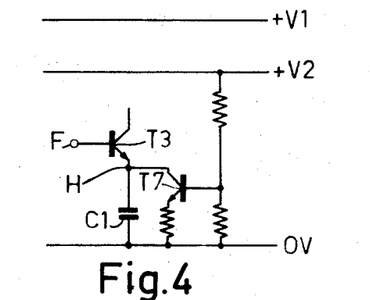
FIGS. 4 and 5 show respective modifications of FIG. 3.
Figure 5:
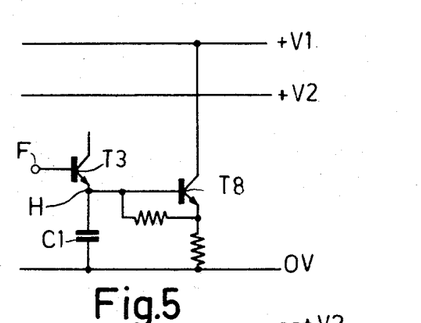
Figure 6:
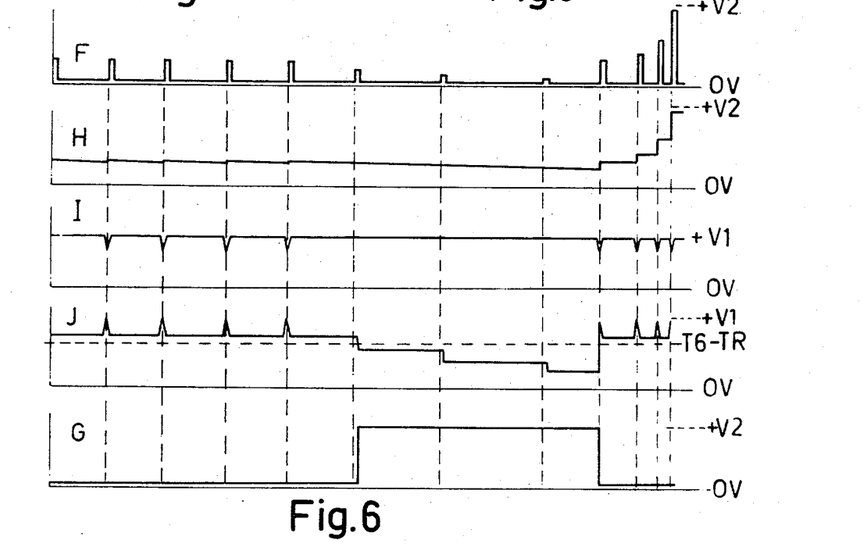
FIG. 6 shows waveform diagrams for FIG. 3.

FIG. 3 shows the deceleration detector. FIGS. 4 and 5 show two alternatives to a discharge resistor R1 for a capacitor C1 in FIG. 3. FIG. 6 shows waveforms which are present at various points of FIG. 3.

The waveform generated by the circuit shown in FIG. 1 at terminal F is applied to the base of a transistor T3. Thus the capacitor C1 connected to the emitter of transistor T3 is charged on every positive pulse at terminal F so that its voltage is equal to the maximum voltage applied to the base of transistor T3 less the base/emitter voltage drop $V_{be}$ of the transistor. Between pulses, capacitor C1 is partially discharged through the resistor R1.

Normally, transistor T3 will conduct a pulse of current (see waveform I — FIG. 6) every time there is a positive pulse of voltage at terminal F. If the deceleration of a vehicle wheel which is being sensed to produce the alternating electrical signal at terminal A becomes high enough, then successive voltage pulses at terminal F will be lower in amplitude than the voltage at side H of capacitor C1. Thus, there will no longer be any pulses from the collector of transistor T3. This absence of pulses from transistor T3 is detected and used to produce an electrical output for actuating an anti-lock control valve.

Before describing the method of detection, we will consider first the way in which the deceleration level is set up at which the pulses from transistor T3 cease.

Since the peak voltage at terminal F is proportional to wheel speed it follows that transistor T3 will stop producing pulses when the rate of fall of the peak voltage at terminal F is greater than the rate of fall of the voltage at side H across capacitor C1. With a simple resistor (R1) discharging capacitor C1, as shown in FIG. 3, the deceleration value at which transistor T3 ceases to produce pulses will increase with speed. This may be satisfactory for some applications but if it is not, then the circuit shown in FIG. 4 or FIG. 5 may be adopted to give a constant current discharge for capacitor C1 and hence a constant deceleration setting. In the circuit of FIG. 4, a transistor T7 has its base connected to a point of fixed potential so that the emitter of this transistor is at the same fixed potential, less the $V_{be}$ of the transistor, due to the presence of an emitter resistor. The collector of transistor T7 is connected to the H side of the capacitor C1 which is thus provided with a constant current discharge path through the transistor T7 because the emitter potential of the latter cannot change. In the circuit of FIG. 5, a transistor T8 has its base connected to the H side of capacitor C1. The base/emitter current of transistor T8 due to its $v_{be}$ is very much less (say one tenth) than the capacitor discharge current required for a given deceleration setting. The main discharge current flows through the resistor connected between the base and emitter of transistor T8. This discharge current remains substantially constant despite variation of voltage at the H side of capacitor C1 because the voltage drop across said resistor is held at this voltage minus the $v_{be}$ of transistor T8.

Transistor T3 will commence to produce pulse once more when the peak voltage at terminal F again exceeds the voltage at side H of capacitor C1.

The method of detecting the absence of pulses from transistor T3 will now be described.

Each time transistor T3 produces a pulse, it turns on a transistor T4 and a capacitor C2 is charged up to the voltage on the stabilized supply line, plus the $v_{be}$ of a diode D1, because a transistor T5 is turned on during this period. Immediately after this, there is a positive pulse at terminal D which turns off transistor T5 and causes capacitor C2 to be partially discharged through diode D1 and a collector load resistor R2 of transistor T5 and. As can be seen from waveform J in FIG. 6 this is insufficient to turn on a transistor T6. This sequence is repeated until a pulse is missed from transistor T3 where upon the next positive pulse at terminal D causes capacitor C2 to be discharged sufficiently to turn on transistor T6.

When the pulses start again from transistor T3, capacitor C2 is rapidly charged up so that transistor T6 turns off again.

Thus, the output at terminal G goes positive when the deceleration of the wheel exceeds a preset reference which is determined by capacitor C1 and its discharge means. The output from terminal G goes negative again when the pulses from transistor T3 commence.

Figure 7:
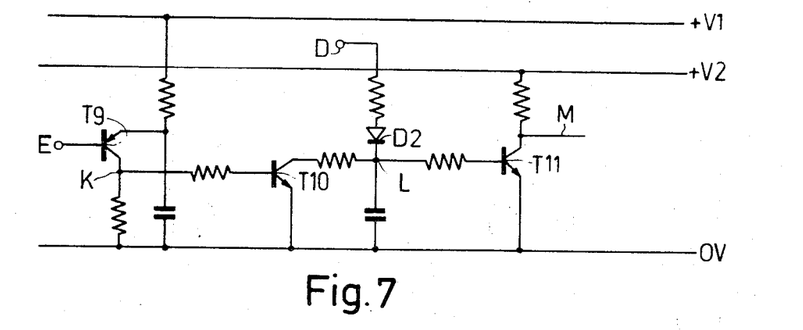
FIG. 7 shows an acceleration detector of the control circuit means.
Figure 8:
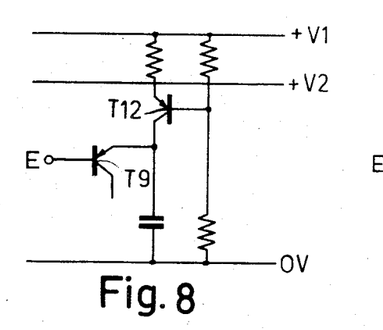
FIGS. 8 and 9 show respective modifications of FIG. 7.
Figure 9:
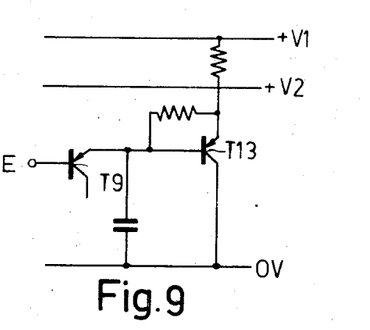

The circuit for the acceleration detector is shown in FIG. 7. FIGS. 8 and 9 show two alternative ways of obtaining a constant current charging characteristic for a capacitor C3 therein, if required.

The operation of the circuits of FIGS. 7 to 9 are substantially identical to those of the deceleration detector and associated constant current discharge circuits except that all of the polarities are reversed. The output at terminal M is normally positive and goes negative when the acceleration exceeds a preset value as determined by missed pulses at point K, which corresponds to point I in FIG. 3.

Figure 10:
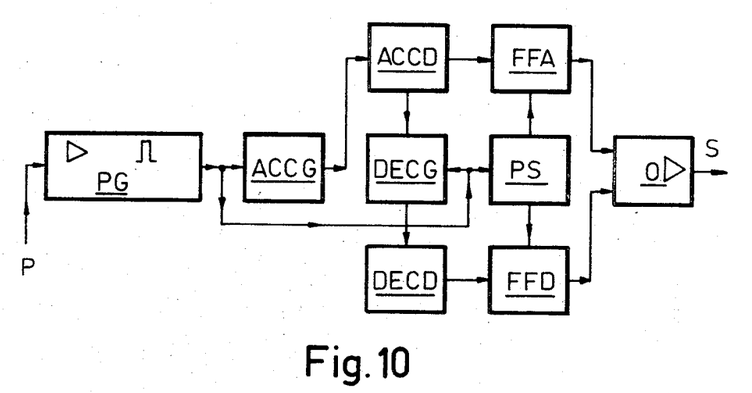
FIG. 10 is a block diagram of a control means embodying the invention.

FIGS. 10 and 11 show a complete control circuit means for an anti-lock vehicle brake system of the character referred to. This control circuit means differs from the control circuit means described above with reference to FIGS. 1 to 9 in the following respects.

Figure 11A:
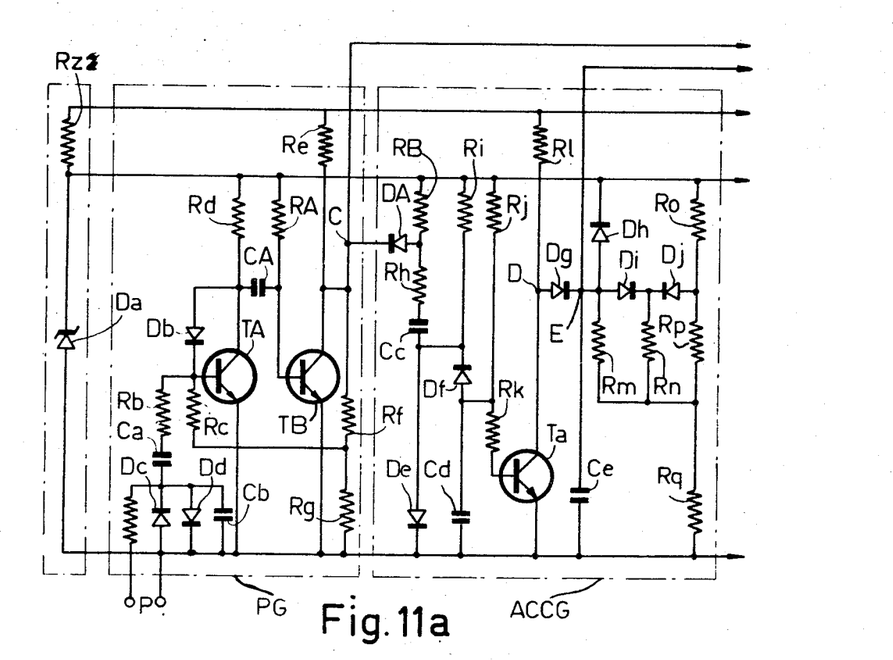
FIGS. 11a, 11b, and 11c are circuit diagrams of FIG. 10.
Figure 11B:
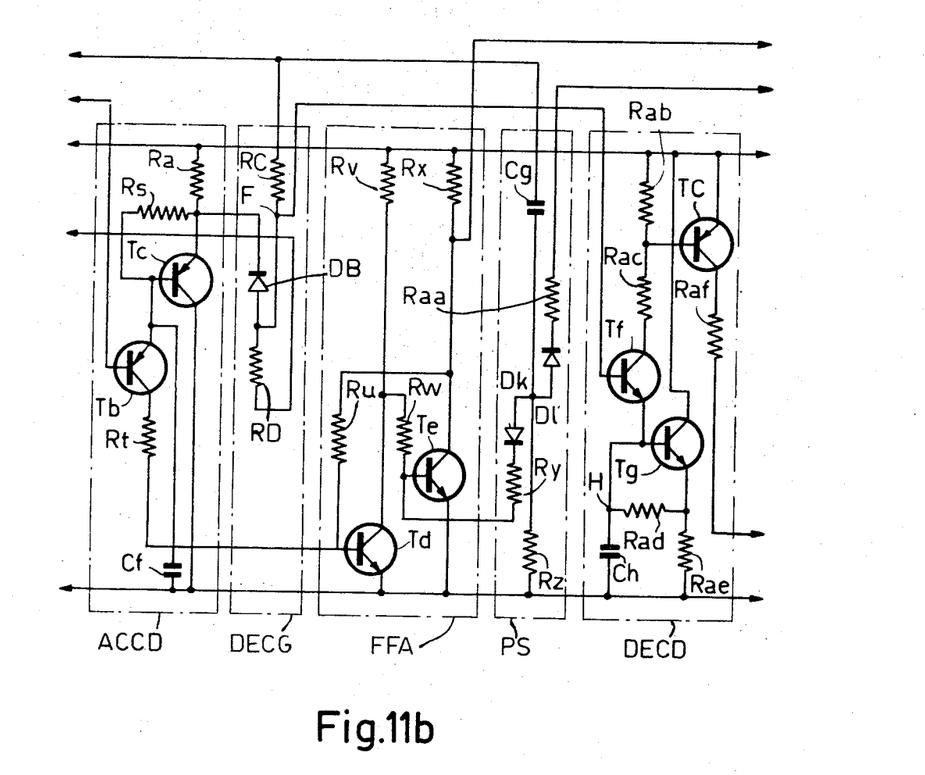
Figure 11C:
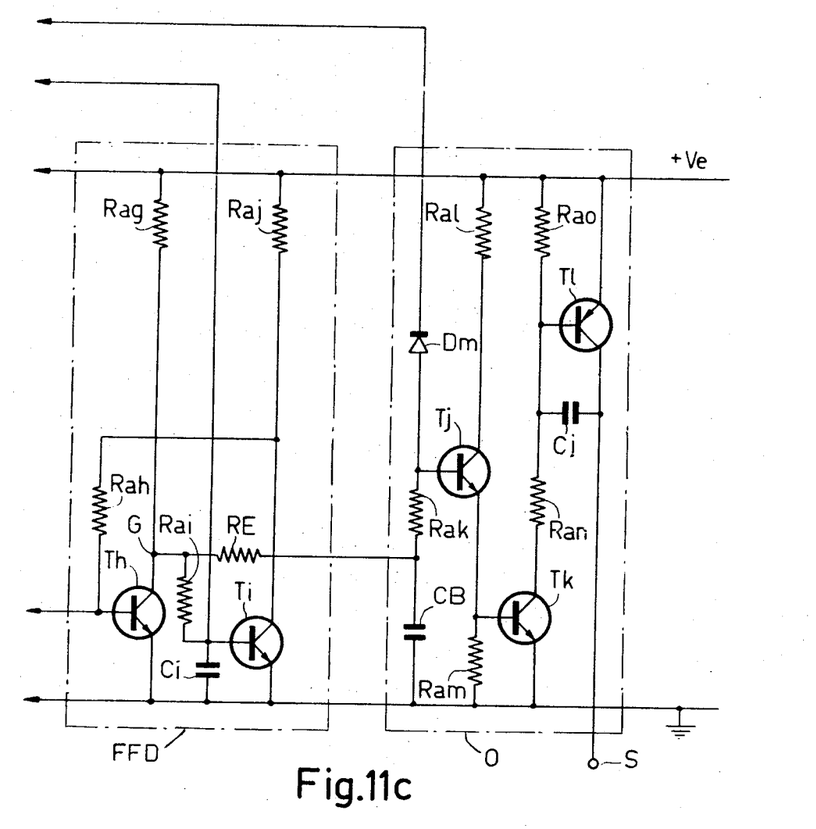

FIG. 11 comprises three sheets consisting of FIGS. 11a, 11b, and 11 c which should be laid together lengthwise with FIG. 11b to the right of FIG. 11a and FIG. 11c to the right of FIG. 11b to make up FIG. 11.

FIG. 1 shows as aforesaid, an amplifier and limiter AL followed by a transistor T1 which generates a 200 μsec pulse at terminal C.

The circuit in FIG. 11 has its amplifier and limiter modified by the inclusion of a capacitor CA to give a.c. coupling between transistor TA and TB. This causes the amplifier to behave as a monostable circuit instead of a bistable and to produce the 200 μsec pulse directly without the addition of transistor T1.

Originally, the base of transistor TB would have been connected to the collector of TA via a resistor and a resistor RA now shown between the base of transistor TB and the stabilized supply line would not exist.

The 200 μsec pulse duration is determined by the capacitor CA and the resistor RA, and also by the voltage change on the collector of transistor TA.

An "acceleration waveform generator" in the circuit of FIG. 11 corresponds to the waveform generator in the circuit of FIG. 1.

In the "acceleration waveform generator" a diode DA and a resistor RB are provided to ensure that it does not reduce the rise time of the 200 μsec pulse. This is important with this circuit because the rising edge of this pulse is used to trigger the bistables later on in the circuit.

The output D in FIG. 1 is no longer used.

The output E is fed to the acceleration detector as before.

The output F is fed to the deceleration detector as before, but the components used to generate it are modified slightly.

The new components are shown on the new circuit a 'deceleration waveform generator'. The capacitor C3 in the circuit of FIG. 1 is omitted, resistor R3 is replaced by a resistor RC and an additional resistor RD is connected between point F and the stabilized line.

Transistor T2 is replaced by a diode DB which is connected to a point in the acceleration detector instead of point E.

The last of the above modifications is to ensure that the deceleration detector has a limited acceleration response so that it ignors 'false' accelerations of the road wheel of the vehicle which are in fact caused by vibration of the magnetic pickups.

FIG. 2 shows the waveforms generated in FIG. 1. With the circuit of FIG. 11, the waveforms C, D, E, F are correct, though waveform D is no longer used for anything. Waveform B no longer exists. The input to the circuit shown in waveform A now has an incorrect phase relation to the other graphs. The 200 μsec positive pulse shown in waveform C would be generated just as the input waveform A crosses the 'O' volt line going positive.

The phase relationship between waveforms C, D, E, F is correct for FIG. 11. The new deceleration detector in FIG. 11 is split into two parts, the first is called the "deceleration detector," the second is called "bistable for deceleration detector." The bistable performs the function previously performed by transistors T4, T5 and T6 in FIG. 3. The new deceleration detector uses constant current discharge for the capacitor (capacitor C1 in FIG. 5).

Transistor TC in the circuit of FIG. 11b amplifies the current pulse from the deceleration detector and feeds it to the bistable. The bistable is continually being triggered into a state corresponding to point G being positive. The trigger pulse for this is obtained from the 200 μsec pulse via the "pulse shaper." Immediately after this pulse the deceleration detector produces a pulse which sets point G to a low voltage again. The bistable remains in this state until the next 200 μsec pulse arrives.

If the wheel is decelerating faster than the reference rate there will be no pulses from the deceleration detector and the bistable will remain in the state corresponding to point G being positive. This will cause the electrical output to be produced for anti-lock control valve actuation. The output from the bistable is taken from point G. This output is filtered through a resistor RE and capacitor CB to remove the triggering spikes. The filtered signal is then used to turn the output stage on to produce the electrical output for anti-lock control valve actuation.

The waveforms shown in FIG. 6 are correct for FIG. 11, except for waveforms I and J which now have no meaning.

The waveforms acceleration detector is very similar to the new deceleration detector in that it also has a constant current feed to a reference capacitor, as in FIG. 9. It also has a bistable connected to it to replace transistors T10 and T11 in FIG. 7.

The output from the acceleration bistable is not filtered but is taken straight to the output stage via a diode so that when the circuit detects an acceleration in excess of the reference rate, the output stage is turned off.

The block diagram of FIG. 10 illustrates the pulse paths for the circuit of FIG. 11.

Suitable components and component values for the circuit diagram of FIG. 11 are as follows for a wheel diameter of 2 feet. Having 60 teeth/revolution on a toothed ferromagnetic ring rotatable therewith, for which a typical output voltage from the magnetic pickup would be 1 volt peak at 100 cps. (7mph) and 10 volts peak at 1,000 cps. (approx. 70 mph).

| Diodes | Capacitors |
| --- | --- |
| Da - BYZ88C8V2 (Mullard) | Ca - 0.22 μF |
| Db to Dj - OA202 (Mullard) | Cb - 0.1 μF |
| DA, DB -    "            " | CA - 0.022 μF |
|  | Cc - 0.022 μF |
| Transistors | Cd - 0.047 μF |
|  | Ce - 0.1 μF |
| TA - BC108 (Mullard) | Cf - 0.47 μF |
| TB -   "         " | Cg - 2000 pF |
| Ta -   "         " | Ch - 0.47 μF |
| Tb - BCY71    " | Ci - 4700 pF |
| Tc - BCY71    " | Cj - 2.2 μF |
| Cj - BC108    " | CB - 0.1 μF |
| Te -   "         " |  |
| Tf -   "         " |  |
| Tg -   "         " |  |
| Th -   "         " | +Ve = 12 volts |
| Ti -   "         " |  |
| Tj -   "         " |  |
| Tk - BFY52    " |  |
| Tl - ADY26    " |  |
| TC - BCY71    " |  |

The American equivalents of the above transistor and diode circuit components may be found in the Semiconductor Diode & SCR D.A.T.A. Book, Computing and Software, Inc., 32 Lincoln Avenue, Orange, New Jersey, 07050.

Resistors

| | |
|---|---|
| Ra - 150 ohms | Rv - 330 K ohms |
| Rb - 22 K ohms | Rw - 100 K ohms |
| Rc - 220 K ohms | Rx - 100 K ohms |
| Rd - 47 K ohms | Ry - 12 K ohms |
| RA - 100 K ohms | Rz - 12 K ohms |
| Re - 1K5 ohms | Raa - 12 K ohms |
| Rf - 68 K ohms | Rab - 680 K ohms |
| Rg - 12 K ohms | Rac - 100 ohms |
| RB - 1K8 ohms | Rad - 150 K ohms |
| Rh - 100 ohms | Rae - 330 K ohms |
| Ri - 100 K ohms | Raf - 10 K ohms |
| Rj - 82K ohms | RC - 47 K ohms |
| Rk - 1 K ohms | RD - 100 K ohms |
| Rl - 1 K ohms | Rag - 2K2 ohms |
| Rm - 33 K ohms | Rah - 100 K ohms |
| Rn - 33 K ohms | Rai - 100 K ohms |
| Ro - 2K2 ohms | Raj - 12 K ohms |
| Rp - 2K2 ohms | Rak - 1 K ohms |
| Rq - 2K2 ohms | Ral - 220 ohms |
| Rr - 330K ohms | Ram - 10 K ohms |
| Rs - 150 K ohms | Ran - 22 ohms (3 watts) |
| Rt - 100 ohms | Rao - 4.7 ohms (3 watts) |
| Ru - 680 K ohms | |

Figure 12:
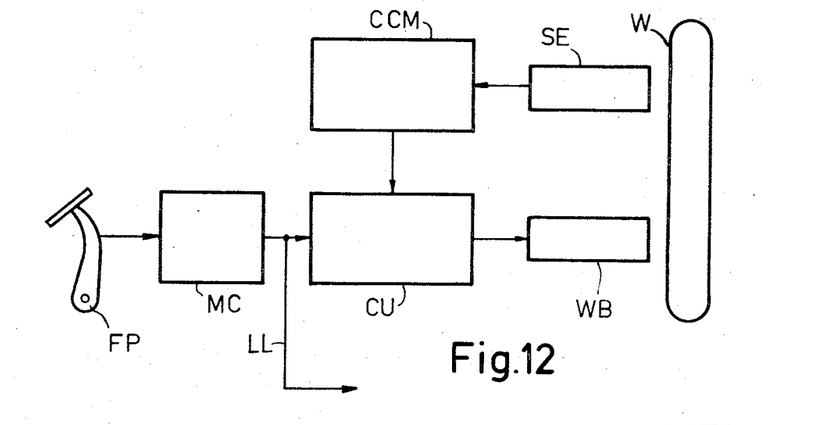

FIG. 12 shows diagrammatically a general layout for an anti-lock vehicle brake system in which the present invention can be embodied. This layout shows a brake foot pedal FP for actuating the piston of a master cylinder MC which constitutes a fluid pressure source of the system. The master cylinder is arranged to actuate (directly or via a servo) a wheel brake WB for a vehicle wheel W via an anti-lock control unit CU. A wheel sensor SE applies electrical pulses related to wheel rotational movement to a control circuit means CCM. The anti-lock control unit CU would include control valve means arranged for actuation in response to an electrical output from the control circuit means CCM to relieve the braking pressure applied to the wheel brake WB. This system is of the character previously referred to, and in the present instance, the electrical output would be produced from the control circuit means CCM when the deceleration of the wheel is in excess of a predetermined value. The wheel sensor SE would be the pickup and a solenoid and an anti-lock control valve would be included in the anti-lock control unit CU.

As indicated by the lead LL, separate systems as shown in FIG. 12 (with a common fluid pressure source) may be provided in respect of each road wheel of a vehicle, but it would also be possible to provide a single system from two (rear) wheels driven by a vehicle propellor shaft with a sensor associated with the shaft for producing the electrical signals related to wheel rotational movement. As an alternative, a single anti-lock control unit including control valve means may be provided in common for all the road wheels of a vehicle. In this case each road wheel would have its one wheel sensor and associated control circuit means, and any of the latter would provide an electrical output to actuate the control valve means when the appertaining wheel tends towards a locked condition.

What we claim is:

1. Control circuit means for detecting frequency variations in an AC signal comprising, means responsive to an alternating electrical signal for generating a signal waveform whose frequency is the same as the frequency of the alternating electrical signal and whose peak value is substantially proportional to the instantaneous frequency of the alternating electrical signal, capacitor storage means for storing said peak value, current path means coupled to said capacitor storage means for causing or allowing the voltage on said capacitor storage means due to said peak value to change at a predetermined rate during the interval between successive peak values of said waveform, and detecting means for deriving an output signal when the amplitude of said waveform is changing faster than the voltage on said capacitor storage means thereby to detect a predetermined rate of change of the frequency of said alternating electrical signal.

2. Control circuit means as claimed in claim 1 wherein said detecting means is responsive to a decreasing frequency of said alternating electrical signal.

3. Control circuit means as claimed in claim 2, wherein the waveform generating means includes means further responsive to said alternating electrical signal and to said waveform to generate a further waveform whose frequency is the same as the frequency of the alternating electrical signal and whose peak value is a function of the instantaneous frequency of the alternating electrical signal, the peak value of said further waveform being of opposite polarity to the peak value of said waveform, and the control circuit means including second capacitor storage means for storing the peak value of said further waveform, second current path means for causing or allowing the voltage on said second capacitor storage means to change at a predetermined rate during the interval between successive peak values of said further waveform, and second means for detecting when the amplitude of said further waveform is changing faster than the voltage on said second capacitor storage means, said second detecting means being responsive to an increasing frequency of said alternating electrical signal.

4. Control circuit means as claimed in claim 1 wherein the current path means provides a current discharge circuit for the capacitor means which is rendered effective by the detecting means during the interval between successive peak values of the waveform, the time constant afforded by the current discharge circuit and the capacitor storage means determining said predetermined rate of change of the voltage on the capacitor storage means.

5. Control circuit means as claimed in claim 4, wherein said storage means comprises a capacitor and said current discharge circuit comprises a resistance shunting said capacitor, whereby said predetermined rate of change of the voltage on the capacitor storage means increases with the value of said voltage.

6. Control circuit means as claimed in claim 4, wherein said current discharge circuit comprises transistor means adapted to provide a substantially constant current path across said capacitor.

7. Control circuit means as claimed in claim 6, wherein said transistor means comprises a transistor having its base connected to a bias potential to render the transistor conductive, the transistor having an emitter resistance arranged so that the voltage at the transistor emitter is substantially the same as its base voltage less the $V_{be}$ of the transistor, the voltage on said capacitor producing a current flow through said emitter resistance when the current discharge circuit is rendered effective, and the emitter voltage together with the emitter resistance determines said predetermined rate of change of the voltage on the capacitor storage means.

8. Control circuit means as claimed in claim 6, wherein said transistor means comprises a transistor having its base connected to one side of said capacitor means, a coupling resistance connected between the base and emitter of said transistor, and an emitter resistance for the transistor through which current flows due to the voltage on said capacitor when the current discharge circuit is rendered effective, said predetermined rate of change of the voltage on the capacitor storage means being substantially determined by the current flow through said coupling resistance, the voltage drop across which remains substantially constant at the $V_{be}$ of said transistor.

9. Control circuit means as claimed in any preceding claim, wherein the detecting means comprises a transistor having its emitter connected to receive the voltage on said capacitor storage means and its base connected to receive the appertaining waveform, said transistor being responsive to each peak value of said waveform to cause or allow the capacitor storage means to store said peak value and said transistor being further responsive to produce a first electrical output when it is no longer responsive to said peak value at its base due to the amplitude of said peak value being insufficient to change the conductive state of the transistor having regard to the transistor emitter voltage as determined by the voltage on said capacitor storage means.

10. Control circuit means as claimed in claim 9, wherein said transistor normally produces an output pulse in response to each peak value of said waveform, said electrical output being the absence of such output pulses when the transistor is further responsive as aforesaid, and wherein the control circuit means further includes output means responsive to each pulse of a train of pulses at the alternating electrical signal frequency to produce an output signal if the pulse is immediately preceded by said electrical output from the detecting means.

11. Control circuit means as claimed in claim 10, wherein said output means comprises capacitor means which is responsive to each said pulse to tend to acquire a charge appropriate for producing a voltage that exceeds the triggering level of an output transistor, the charge on said capacitor means being altered in the reverse sense by each of said output pulse from the detecting means, whereby said charge is acquired when said electrical output is produced to cause said output transistor to produce said output signal.

12. Control circuit means as claimed in claim 10, wherein said output means comprises a bistable element which is set to one state by each said pulse and reset to the other state by each said output pulse, whereby said bistable element remains in said one state when said electrical output is produced to cause an output transistor to produce said output signal.

13. Control circuit means as claimed in claim 1 wherein the current path storage means provides a charge circuit for the capacitor means which circuit is rendered effective by the detecting means during the interval between successive peak values of the signal waveform, the charge circuit and the capacitor storage means together providing a time constant that determines said predetermined rate of change of the voltage on the capacitor storage means.

14. Control circuit means as claimed in claim 13 wherein said charge circuit comprises a transistor connected in circuit so as to provide a constant current charge path across said capacitor storage means.

* * * * *